(12) United States Patent
O'Brien et al.

(10) Patent No.: US 11,693,868 B2
(45) Date of Patent: Jul. 4, 2023

(54) INSIGHT GENERATION BASED ON RETRIEVED PLM DATA

(71) Applicant: aPriori, Inc., Concord, MA (US)

(72) Inventors: Patrick O'Brien, Concord, MA (US); Stephanie Feraday, Natick, MA (US)

(73) Assignee: APRIORI TECHNOLOGIES, INC., Concord, MA (US)

( * ) Notice: Subject to any disclaimer, the term of this patent is extended or adjusted under 35 U.S.C. 154(b) by 18 days.

(21) Appl. No.: 17/331,786

(22) Filed: May 27, 2021

(65) Prior Publication Data

US 2021/0382884 A1 Dec. 9, 2021

Related U.S. Application Data

(60) Provisional application No. 63/036,050, filed on Jun. 8, 2020.

(51) Int. Cl.

| | |
|---|---|
| *G06F 16/248* | (2019.01) |
| *G06F 16/245* | (2019.01) |
| *G06F 16/25* | (2019.01) |
| *G06F 30/10* | (2020.01) |
| *G06F 16/21* | (2019.01) |
| *G06F 119/18* | (2020.01) |

(52) U.S. Cl.
CPC .......... *G06F 16/248* (2019.01); *G06F 16/211* (2019.01); *G06F 16/245* (2019.01); *G06F 16/25* (2019.01); *G06F 30/10* (2020.01); *G06F 2119/18* (2020.01)

(58) Field of Classification Search
CPC .... G06F 16/248; G06F 16/211; G06F 16/245; G06F 16/25; G06F 30/10; G06F 2119/18; G06F 16/258

USPC .......................................................... 707/722
See application file for complete search history.

(56) References Cited

U.S. PATENT DOCUMENTS

| | | | | |
|---|---|---|---|---|
| 7,698,323 B1 * | 4/2010 | Rangan | ................. | G06F 16/256 717/122 |
| 8,566,066 B2 * | 10/2013 | Thompson | .............. | G06F 30/00 715/764 |
| 8,818,769 B2 * | 8/2014 | Trainer | ................... | G06F 30/00 703/1 |

(Continued)

OTHER PUBLICATIONS

International Search Report and Written Opinion dated Sep. 22, 2021 which was issued in connection with PCT/US21/36333.

*Primary Examiner* — Hicham Skhoun
(74) *Attorney, Agent, or Firm* — Buckley, Maschoff & Talwalkar LLC

(57) ABSTRACT

Provided are systems and methods that can extract part data from a PLM database and suggest changes to the manufacturing of the part. In one example, the method may include querying a database for a plurality of values of a part to be manufactured from a plurality of fields of computer-aided design (CAD) file stored in the database, mapping the plurality of fields of the CAD file to a plurality of corresponding fields of a host platform based on a type of the database, extracting the plurality of values from the CAD file and transferring the plurality of values to the mapped plurality of corresponding fields of the host platform, determining changes to one or more manufacturing attributes of the part to be manufactured based on the transferred plurality of values, and outputting the changes to a display.

17 Claims, 10 Drawing Sheets

(56) References Cited

U.S. PATENT DOCUMENTS

| | | | |
|---|---|---|---|
| 8,890,867 B2* | 11/2014 | Buchowski | G06T 19/20 345/420 |
| 8,892,404 B2* | 11/2014 | Potter | G06F 30/00 703/1 |
| 10,019,689 B2* | 7/2018 | Varshney | G06Q 10/0637 |
| 10,037,403 B2* | 7/2018 | Young | G06F 30/17 |
| 10,928,809 B2* | 2/2021 | Salapakkam | G06F 30/20 |
| 2003/0115026 A1 | 6/2003 | Kuzumaki et al. | |
| 2005/0071135 A1* | 3/2005 | Vredenburgh | G06N 5/02 700/98 |
| 2005/0102050 A1 | 5/2005 | Richey | |
| 2006/0235555 A1 | 10/2006 | Seong et al. | |
| 2007/0288119 A1* | 12/2007 | Wright | G06F 30/00 700/182 |
| 2008/0086683 A1* | 4/2008 | Rich | G06F 16/86 715/239 |
| 2016/0328449 A1* | 11/2016 | Fa | G06F 16/282 |
| 2017/0004225 A1* | 1/2017 | Antalek | G06F 21/6218 |
| 2017/0132556 A1* | 5/2017 | Dobinson | G06F 16/258 |

\* cited by examiner

FIG. 1B

Insight Notification     160

The following components have been analyzed for manufacturability and cost. Click the Part ID Link below to Review Manufacturing Guidance.
— 161

— 162

| Part ID | Process | Risk | Cost | Costing Result |
|---|---|---|---|---|
| Injmols_Exercise | Plastic Molding | Medium | $8 | Success |
| Sandcast_Exercise — 163 | Casting-Sand | High | $207 | Success |
| DTC_Euro | Stock Machining | Low | $558 | Succes |
| Bracket_V1 | Sheet Metal | Low | $5 | Incomplete |

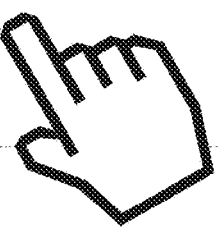

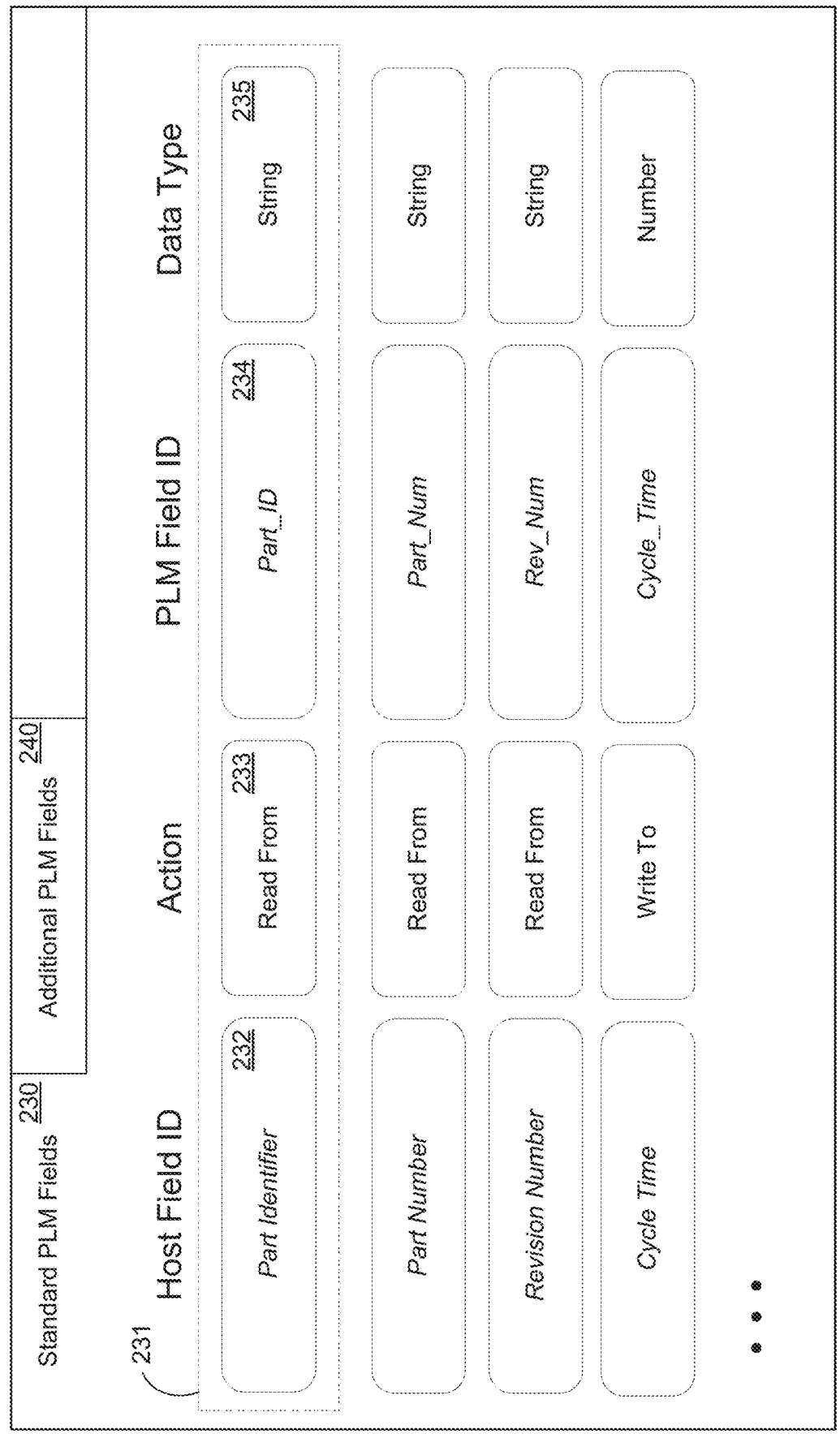

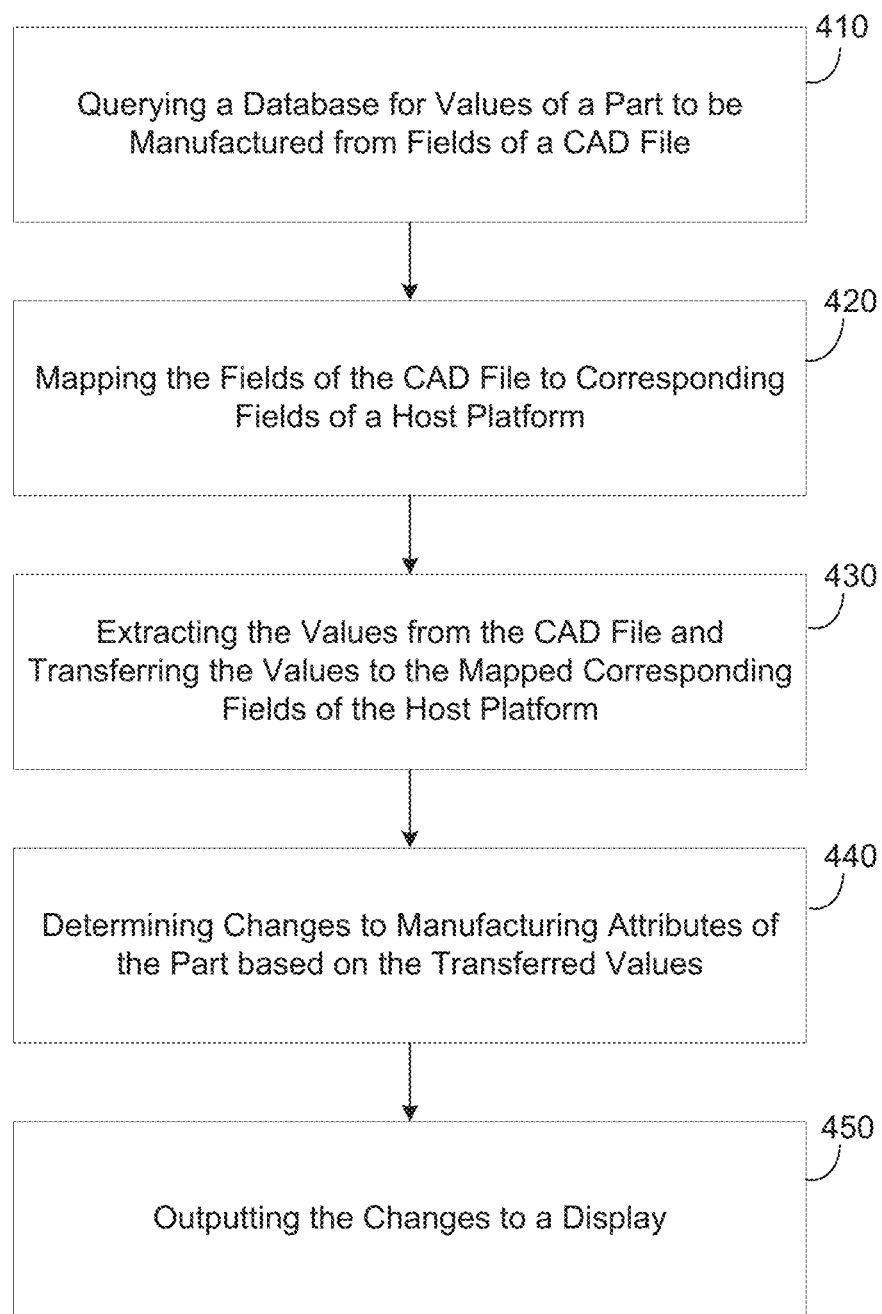

INSIGHT GENERATION BASED ON RETRIEVED PLM DATA

CROSS-REFERENCE TO RELATED APPLICATION(S)

This application claims the benefit under 35 USC § 119(e) of US Provisional Patent Application No. 63/036,050, filed on Jun. 8, 2020, in the United States Patent and Trademark Office, the entire disclosure of which is incorporated herein for all purposes.

BACKGROUND

Computer-aided design (CAD) is a technology by which computers can be used to aid in creating, modifying, and optimizing component design such as manufacturing components and parts. CAD software may use vector-based graphics to depict objects rather than relying on traditional hand drawings. In some cases, CAD software may produce raster graphics showing the overall appearance of designed object. CAD software may involve more than just shapes. For example, the CAD may convey information, such as materials, processes, dimensions, tolerances, or the like, according to application-specific conventions.

A part designer often puts together a model of a part using CAD software. The part designer then provides the model (CAD drawing) to a manufacturing company. Typically, the designer may focus on factors that can affect performance such as size, shape, material, tolerances, and the like. However, the designer may not understand manufacturing complexity/cost of such a design. For example, a one inch hole within a particular shaped component may require three different specialized drilling operations during manufacturing while a half-inch hole in a similar position on the component may require only one standard drilling operation. As another example, a shape of a cut within a piece of sheet metal may not be manufactured due to a thickness of the sheet metal. The designer may never be made aware of such problems. In some cases, the designer may find out about the problem weeks after the design has been submitted for manufacture, creating significant delays.

SUMMARY

According to an aspect of an example embodiment, provided is a computing system that includes a processor which may be configured to query a database for a plurality of values of a part to be manufactured from a plurality of fields of computer-aided design (CAD) file stored in the database, map the plurality of fields of the CAD file to a plurality of corresponding fields of a host platform based on a type of the database, extract the plurality of values from the CAD file and transfer the plurality of values to the mapped plurality of corresponding fields of the host platform, determine changes to one or more manufacturing attributes of the part to be manufactured based on the transferred plurality of values, and output the changes to a display.

According to an aspect of another example embodiment, provided is a method that may include querying a database for a plurality of values of a part to be manufactured from a plurality of fields of computer-aided design (CAD) file stored in the database, mapping the plurality of fields of the CAD file to a plurality of corresponding fields of a host platform based on a type of the database, extracting the plurality of values from the CAD file and transferring the plurality of values to the mapped plurality of corresponding fields of the host platform, determining changes to one or more manufacturing attributes of the part to be manufactured based on the transferred plurality of values, and outputting the changes to a display.

According to an aspect of another example embodiment, a non-transitory computer readable medium may perform querying a database for a plurality of values of a part to be manufactured from a plurality of fields of computer-aided design (CAD) file stored in the database, mapping the plurality of fields of the CAD file to a plurality of corresponding fields of a host platform based on a type of the database, extracting the plurality of values from the CAD file and transferring the plurality of values to the mapped plurality of corresponding fields of the host platform, determining changes to one or more manufacturing attributes of the part to be manufactured based on the transferred plurality of values, and outputting the changes to a display.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1B is a diagram illustrating a user interface that includes a display of results of a manufacturability analysis in accordance with an example embodiment.

FIGS. 2B and 2C are diagrams illustrating a mapping table of the agent software program of FIG. 2A, in accordance with an example embodiment.

FIG. 4 is a diagram illustrating a method for extracting PLM data and generating insight of a component in accordance with an example embodiment.

Figure 1A:
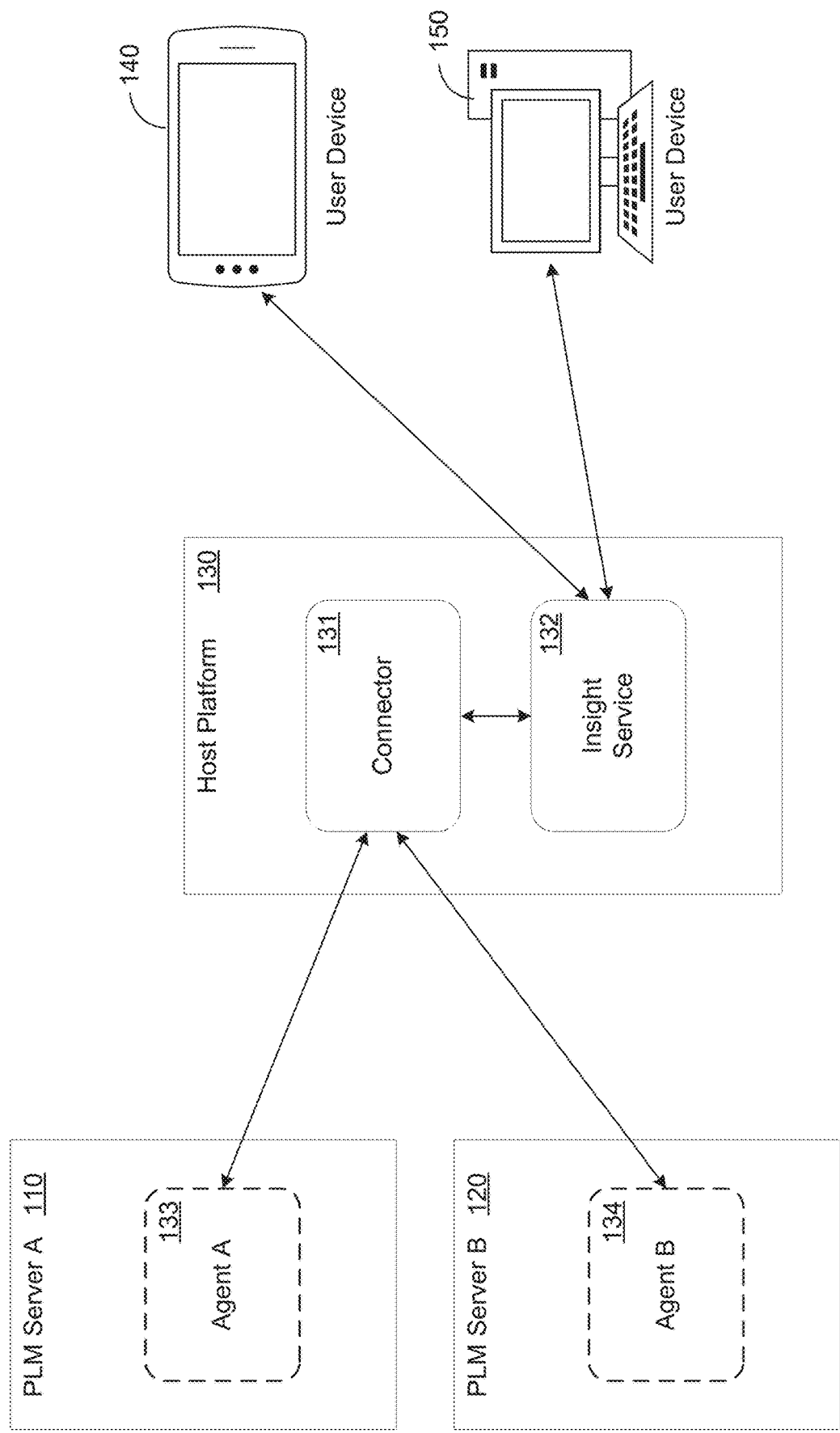
FIG. 1A is a diagram illustrating a system for PLM data extraction and insight generation in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

A designer of a part to be manufactured is often unaware of factors that can significantly affect the complexity of the manufacturing of the part. Complexities such as specialized tooling and additional tooling processes can be caused by different geometric features within the design and can create numerous drawbacks such as delays, design flaws, increased manufacturing costs, and the like. For example, a geometric feature such as a cut, a bend, a hole, a shape, etc., may require specialized manufacturing (via specialized tools) rather than basic manufacturing (via basic tools). As another example, a designer may choose a location, a size, a tolerance specification, etc., based on preference without having any understanding that a different location, size, pattern, etc., can be manufactured using a simpler process. Furthermore, a change in one design attribute of the component can create problems in other design attributes of the component.

During a design phase of the part, the designer can generate a technical model such as a computer-aided design (CAD) model stored in a file that includes a rendering/visualization of the part. In addition to the structural design (geometric shape) of the part, the CAD file may include additional attributes that are stored within metadata of the CAD file itself or within a parts object that is paired with the CAD file. The additional attributes may include a volume/amount of the part to be manufactured, material to be used, manufacturing processes, dimensions, tolerances, and the like. When a designer is finished, the CAD file and its corresponding parts object may be submitted to a manufacturer for manufacturing a quantity of the part.

Many designers use product lifecycle management (PLM) software to create their CAD file. The PLM software then stores a copy of the CAD file in its own PLM database. PLM databases have different configurations for data that is stored in CAD files and parts objects. As just a few examples, PTC WINDCHILL® and SAP TEAMCENTER® have different APIs that use different field names, data types, and the like.

The example embodiments are directed to a host platform and method that can identify and suggest design modifications to a part/component thereby reducing manufacturing complexity and cost. Rather than require a user to submit a CAD file, the host platform (e.g., web server, cloud platform, on-premises server, etc.) may query a remote database (e.g., web server, cloud platform, on-premises server, etc.) such as a product lifecycle management (PLM) database, or the like, for part data. In particular, a connect program on the host platform may transmit a query message to an agent installed on the PLM system. The query message may include data fields that are understood by the host platform. In response, the agent may translate/convert the data fields and other values into a format of the PLM system. The converted query message may be transmitted by the agent to the PLM database, via an API of the PLM system. The agent may receive the queried values from the PLM database, and provide the results to the connector of the host platform. Here, the agent may convert the results into a format that is understood by the host platform.

According to various embodiments, the agent may include mappings that enable the agent to translate values within the query into values that have a format that is understood by the respective PLM database in which the agent is installed including a format that is understood by an application programming interface (API) of the PLM database. The agent may include different mappings for different types of PLM databases. In doing so, the agent enables part/component data to be extracted from CAD files stored in the PLM database without the querying software having to understand the data format and features of the PLM API. Instead, the agent abstracts away the differences between field names values, data types, and the like, creating a seamless experience across different PLM databases.

Based on data extracted by the agent from the PLM database, the system can identify one or more geometric features of interest of the part and recommend modifications to the one or more geometric features to improve design for manufacturability and cost (DFMC). For example, modifications can be suggested to reduce a number of tools needed, change a specialized tooling process to a basic (standard) tooling process, reduce an amount of manufacturing time, reduce manufacturing cost, reduce number of materials used, and the like. The modifications may include a change in a shape, a size, a location, a depth, a type, and the like, of a geometric feature/design. As another example, the modification may include a suggestion to increase an amount of tolerance (i.e., the amount of variance permitted between the design/CAD and the actual product). The suggested changes may be output to a user interface where a visual representation of the part is shown and a geometric feature of the part may be highlighted or otherwise flagged to visually identify the part. In addition, text content can be provided to describe the recommended change associated with the highlighted part. Here, the user/designer may view the suggestions and make changes to the design prior to the final submission.

The process may be iterative in that multiple suggestions (or rounds of suggestions) are provided to the designer until a most efficient manufacturing design is determined. In this example, the system can automatically check for design guidance and notify the designer of any suggested design changes while the part is being designed and before the part model is submitted for manufacture. Furthermore, the system can suggest changes to the design to meet manufacturing requirements. The system also has the ability to process many parts (e.g., 1000 or more) submitted over predetermined periods of time (e.g., the last thirty days, etc.) and tell the user which parts to focus their effort on, based on number/magnitude of issues. While related systems may perform a rudimentary geometric analysis, the system described herein may perform a full simulation of the manufacturing process, which allows the results to be more complete and avoid some of the "false alarms." The algorithms that the insight service uses to find outliers (e.g., parts that are critical/high risk from a manufacturability standpoint) may be more involved than just number/magnitude of issues. For example, each manufacturing process group (e.g., forging, casting, plastic, etc.) may have its specific algorithm that can be configured for outlier detection.

Furthermore, the system may output suggestions to a user via a user interface of the host system. For example, the suggestions may be provided while the component is being reviewed (e.g., during CAD creation) by the host system thereby making such suggestions prior to the component being manufactured. The system may display feedback about a current manufacturing evaluation of a component and offer ways in which the efficiency can be improved to the user. The system, via the user interface, may guide the user to a more efficient complexity through an iterative process the iteratively provides feedback while the user is changing the design of the product. Furthermore, a user may drill down into manufacturing issues identified by the system and view underlying causes of such manufacturing issues.

FIG. 1A illustrates a system 100 for PLM data extraction and insight generation in accordance with an example embodiment. Referring to FIG. 1A, a host platform 130 may host an insight generation service 132 that recommends modifications to parts that are to be manufactured. Here, the insight generation service 132 may output recommended modifications to one or more user devices 140 and 150. To generate the recommended modifications, the host platform 130 may extract data from one or more PLM servers 110 and 120 which store designs/CAD models of parts to be manufactured. Here, the host platform 130 may be a web server, a cloud platform, or the like, and the PLM servers 110 and 120 may be on-premises servers, cloud servers, web servers, or the like. Furthermore, the user devices 140 and 150 may include personal computers, tablets, mobile phones, laptops, and the like. The host platform 130, the PLM servers 110 and 120, and the user devices 140 and 150 may connect to each other via a network such as the Internet.

To perform data extraction, the host platform 130 may include a connector 131 installed at the host platform 130 and an agent 133 and an agent 134 which are remotely installed at the PLM servers 110 and 120, respectively. A user, via one of the user devices 140 and 150, may request insight for a particular part/model via the insight service 132, which is then forwarded to the connector 131. As another example, the host platform 130 may automatically scan the PLM servers 110 and 120 periodically or based on specific conditions for multiple parts/models at once. For example, the host platform 130 may query the PLM server 110 for all parts manufactured by a User A within the last thirty days and perform a manufacturability and cost analysis on all of the parts at the same time. The results of the analysis may be output via a user interface of the insight service 132 that is displayed on one or more of the user devices 140 and 150.

According to various embodiments, the host platform 130 may automatically query and obtain different types of PLM data from different types of PLM databases using various agents installed therein. The queried information is valuable for manufacturing in the design process and also other areas of supplier management (getting quotes to build their parts, etc.). The host platform 130 can then generate manufacturing guidance via the insight service 132 which tells the design engineer parts of the CAD design that are more difficult to manufacture (more cost). The guidance may include suggested modifications to the design to effect a change of tooling, a change of a design, etc. The host platform 130 may also provide an order of the routing that may be skipped or reduced (reducing the steps in making the part), etc. Furthermore, a cost breakdown may be provided to help educate the designer.

It is possible for a human to interact with a user interface of the PLM servers 110 and 120 to view part data. However, this process does not provide much value to the user because no insight is created and the part data remains in the PLM system. In contrast, in the example embodiments, the host platform 130 remove the user from needing to interact with the PLM servers 110 and 120, and pulls/extracts part data directly from the PLM server. For manufacturing, the CAD models within the PLM servers 110 and 120 hold the product structure (geometric shape) as well as information about other obstacles that goes into the manufacturing such as materials, process information, tolerances, and the like. The host platform 130 can pull out data from the PLM servers 110 and 120 and automatically determine modifications to the parts being designed to reduce costing, and then output the suggested guidance to a user interface. In some embodiments, the user may configure a workflow to attach a detailed report that shows both cost and manufacturability guidance and this report can be attached to the part object in the PLM system. That way the human/user can continue to work within the PLM server user interface and gain some of the benefits. However, for additional guidance, the user may have to open and interact with the user interface provided by the insight service.

In some embodiments, the connector 131 may obtain PLM data from the PLM servers 110 and 120 via a workflow. Here, the workflow specifies what should be pulled out of the PLM system such as part values, time ranges of submission, and the like. The workflow initiates/triggers a query from the connector 131 to one or more of the agents 133 and 134. The agents 133 and 134 are intermediaries which provide a mapping between what data value requested by the host platform 130 and the data values that are stored in the corresponding PLM servers 110 and 120. This agent sits at the customer's location (e.g., cloud or on-premises). The agent is also embedded with mappings which understand the APIs which the PLM servers 110 and 120 require. The agents 133 and 134 may retrieve the CAD files from the PLM server, and provides them to the connector 131.

The agents 133 and 134 may query the PLM data stored in the PLM servers 110 and 120, respectively. The queries are defined in a generic format by the connector 131 of the host platform 130, and then converted by the agents 133 and 134 into specific formats that are understandable to the APIs of the corresponding PLM servers 110 and 120. And then the initial query comes from the CIC application with a generic expression. The query may include names of fields that have data values to be extracted, time ranges, query operators (e.g., AND, OR, etc.) and the like. The resulting data obtained from the querying can be returned to the connector 131 and the insight service 132.

Complexity can be driven by multiple factors. For example, a feature with tolerances which require a specialized manufacturing process can create significant complexity. As another example, a cutting process may require more time than another type of cutting process but the design may need to be modified in order to perform the speedier cutting process. It's not enough to just know the complexity, but there is also a benefit from understanding what is being obtained from the complexity. The insight service 132 may analyze multiple different parts at once, and provide an insight notification 160 of the analysis to one or more of the user devices 140 and 150 as shown in FIG. 1B. For example, the insight notification 160 may be output via a user interface of the insight service 132 displayed on a screen of the user device 140. As another example, the insight notification 160 may be embedded within an email, text message, etc., and sent to a corresponding email application, messaging application, etc., on the user device 140.

Figure 1C:
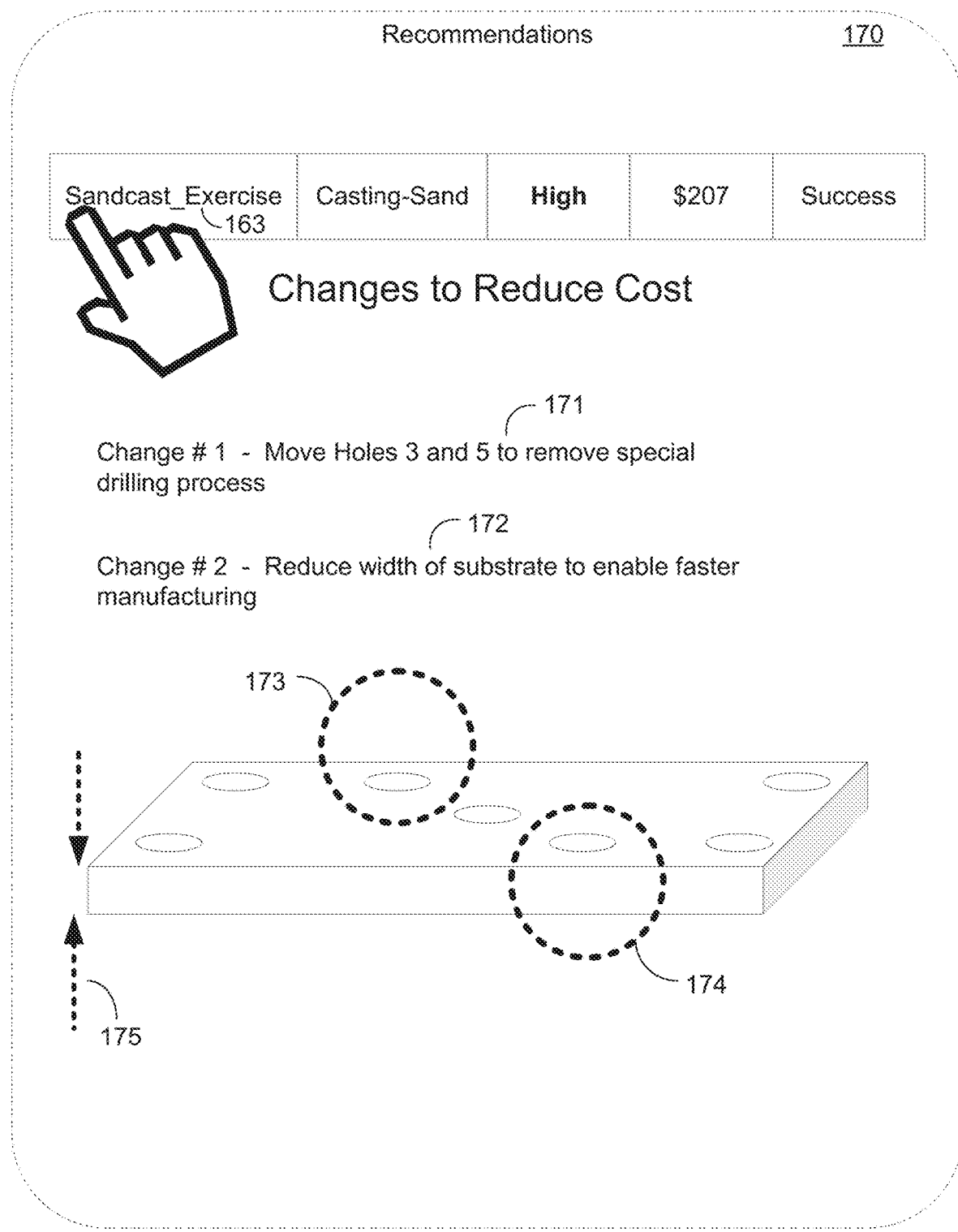
FIG. 1C is a diagram illustrating a user interface that includes suggested changes to a manufacturing process in accordance with an example embodiment.

Here, the insight notification 160 includes a description 161 of the process that is performed and a step to be taken by the user. The insight notification 160 also includes a table of values including an interactive part ID value 162. When the part ID value 162 is clicked on, the user interface may navigate to recommendations screen 170 such as shown in FIG. 1C. In this example, the user selects an interactive part ID value 163 from the table shown in FIG. 1B, which redirects the user interface to the recommendations screen 170 shown in FIG. 1C. Referring to FIG. 1C, the recommendations screen 170 includes a description 171 of a first recommend change, a description 172 of a second recommended change, visualizations 173 and 174 highlighting the features of the first recommend change, and visualization 175 highlighting the feature of the second recommend change. Here, the highlighting process may include different overlayed color, bolding, circles, marks, or any other indicia on the screen which help the user understand which feature the recommended change is associated with.

The type of suggestions/guidance generated by the insight service 132 may be different based on the manufacturing process (e.g., plastic, metal, casting, assembly, etc.) Different materials, processes, machines, geometry features, and the like, may be changed to affect complexity. Some suggested changes can be more costly at first (e.g., to build the mold) but save cost later when making a large quantity of parts based on the mold. Parts can be manufactured in different series of ways. All of the constraints can be taken care of and give guidance to make it simpler or even possible. Furthermore, the insight service 132 may interpret the geometry of the features in the CAD model in different ways based on the type of process being performed. For example, if the component is a sheet metal, the curve may be a bend, whereas a plastic part may just be a molded edge (not a distinct feature). The insight service 132 may assess the geometry and what it represents and then how it might be manufactured.

Figure 2A:
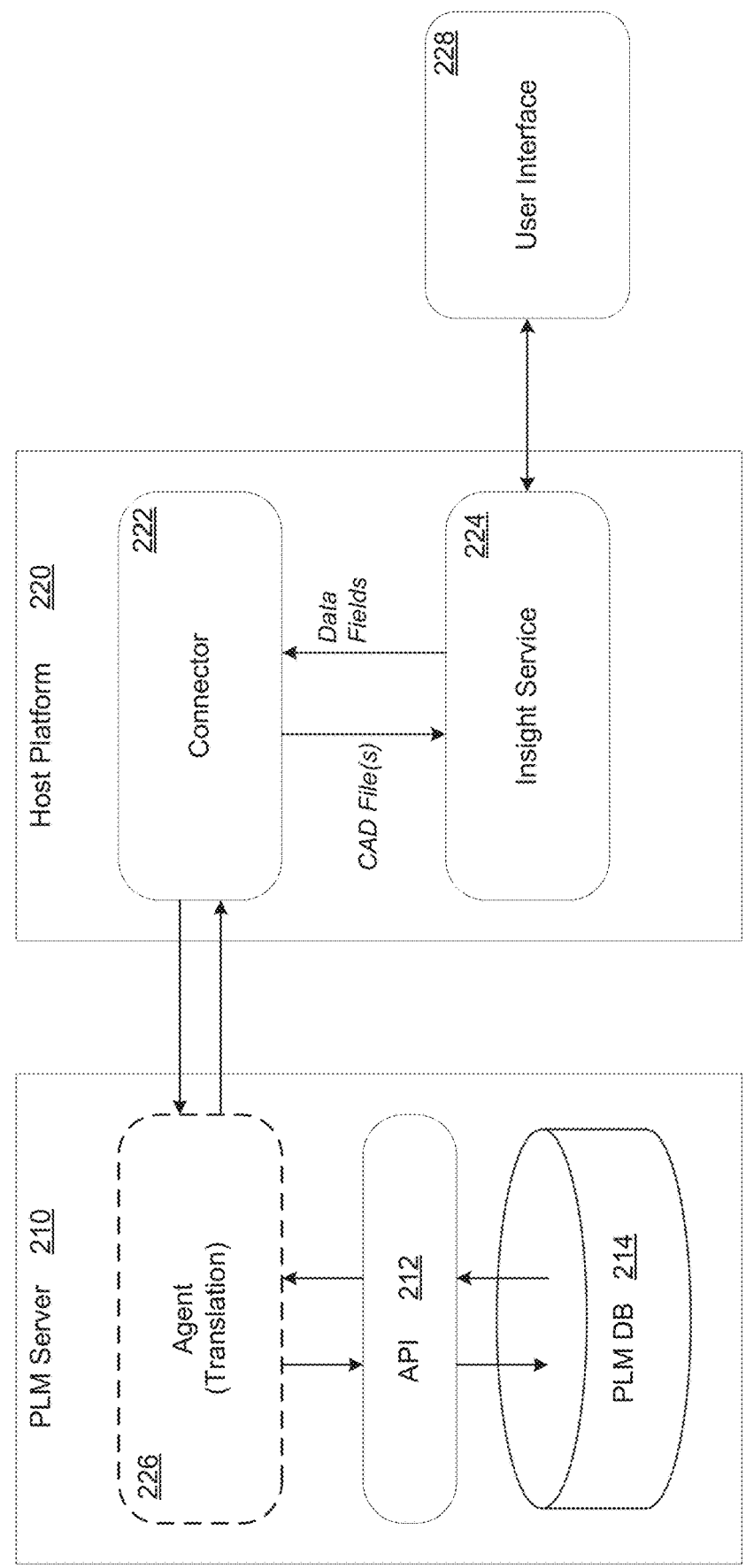
FIG. 2A is a diagram illustrating a process of an agent software program installed on a PLM server in accordance with an example embodiment.

FIG. 2A illustrates a process 200 of an agent 226 which is installed on a PLM server 210 and which extracts data for insight generation in accordance with an example embodiment. Referring to FIG. 2A, a host platform 220 includes a connector 222 and an insight service 224. The insight service 224 may be configured to generate suggested modifications to a part design (e.g., a CAD model, etc.) in order to reduce costs and/or complexity. Meanwhile, the connector 222 is a software program that communicates with agent 226 which is installed on the PLM server 210. In some embodiments, the connector 222 may receive a data request CAD files/data from the insight service 224. As another example, the connector 222 may receive a data request for CAD files/data from a workflow process that is running internally within the host platform 220. The workflow may periodically or conditionally request data from the connector 222, automatically.

The connector 222 may receive the request for CAD files/data and transmit a query to the agent 226. The agent 226 may be in communication with a database 214 of the PLM server 210 via an API 212 of the PLM server. The API 212 may control how data is accessed from the database 214. According to various embodiments, the agent 226 may include a translation process that converts the query from the connector 222/host platform 220 into a query statement that is formatted according to the specifications of the database 214 as specified by the API 212. Here, the agent may use a mapping table such as shown and described with respect to FIG. 2B, to map a data field/value into a different data value, and use the different data value in the query statement.

The agent 226 may transmit the generated query statement to the database 214 via the API 212. In response, the database 214 may return one or more CAD files (and parts objects thereof) to the agent 226 based on the query statement. As another example, the database 214 may extract data from the CAD files/parts object and return the extracted data values to the agent 226. In response, the agent 226 may transfer the CAD files/parts objects to the insight service 224 via the connector 222. Here, the agent 226 may transmit the CAD files/parts objects via an Internet communication channel established between the agent 226 software installed and running on the PLM server 210 and the connector 222 software installed and running on the host platform 220.

In response to receiving the CAD files/parts objects, the insight service 224 may identify modifications that can be performed to the design of the part to reduce complexity and cost of manufacture and output a notification to a user interface 228. The notification may include, but is not limited to, the examples of FIGS. 1B and 1C. Here, the user interface 228 may be on a user device connected to the host platform 220 via the Internet. For example, the host platform 220 may be a cloud platform and the user interface 228 may be within a browser connected to the cloud platform via the Internet and running on a user's device such as a tablet, laptop, mobile phone, or the like.

Within the insight service 224 may be a costing engine (not shown). According to various embodiments, geometric properties of the part to be manufactured can be extracted from the CAD file via the insight service 224 and used by the costing engine to determine changes/modifications to the design of the part. For example, fields that are used to drive the costing of a part such as material, process group, annual volume, VPE, batch size, tolerances, secondary processing, routing, and the like, can be pulled from various sources including: PLM fields, CAD file attributes (PMI), workflow settings, VPE defaults, and user defaults. But regardless of how the costing process is being guided by these inputs, the CAD model may be read and the geometry extracted for the cost engine to generate the cost values and the manufacturing guidance.

In the example of FIG. 2A, the agent 226 may capture data from the PLM DB 214 and transfer it to the connector 222. Then the connector 222 may set things up to be transferred to the costing engine within the insight service 224. It may be a different interface to get to the costing engine, for example. Here, the connector 222 may prepare the inputs that are transferred to the insight service 224. For example, whether the part is supposed to be a tube, sheet metal, etc. may be identified from within the CAD file. In addition, other details about the part may be extracted from the CAD file, as further described below. The connector 222 is responsible for extracting data from the right places and then the costing engine within the insight generation service 224 may generate recommendations. The costing engine may perform a model-based design. For example, the costing engine can read geometry values, tolerance information, etc. from the CAD file. The insight service 224 has code that goes into the CAD file and processes the geometry and understands the spatial connections between things. Geometry extraction and to get all that geometry and the size of the object is performed by the cost engine on the CAD file.

Certain attributes that are drivers of manufacturing complexity can be extracted from the CAD file itself (e.g., inside the metadata) or from a parts object that is an additional data file paired with the CAD file. The attributes may include one or more of tooling information, tolerance information, material information, process information, and the like. The tooling information may provide information about which tools are needed to design geometric features detected from the model in the CAD, for example, whether specialized tools or additional tooling components are needed to manufacture the geometric features detected from the model. The tooling information may identify which features need a specialized tooling, a basic tooling, a number of tools, and the like. The tolerance information may provide an identification of achievable tolerance levels versus requested tolerance levels for cuts, holes, bends, and the like. For example, the tolerance information may identify back-off amounts that are necessary to drop from a specialized tooling process to a basic tooling process, etc. The material information may identify an amount and a type of materials necessary to create identified geometric features, and how those materials affect complexity, and the like. The process information may provide complexity information that is different based on types of manufacturing processes (e.g., casting, plastic molding, sheet metal, etc.) to be performed. It should also be appreciated that other information may be helpful in determining complexity and that the types of information are for purposes of example only.

Complexity can be driven by multiple factors. For example, a feature with tolerances which require a specialized manufacturing process can create significant complexity. As another example, a cutting process may require more time than another type of cutting process but the design may need to be modified in order to perform the speedier cutting process. Therefore, the complexity alone may not be enough, because there is also a benefit from understanding what is being obtained from the complexity. The insight service 224 may make one or more suggestions to the design/CAD model of the part and display a visualization of the part with the feature to be modified highlighted (e.g., in a bright color, etc.) such that it stands out from the other features in the CAD model. Although shown as an image, the suggestions may be output through the user interface 228 enabling the user to view the changes visually. The user interface 228 may also provide text/description which describes the suggested modification. Furthermore, the insight service 224 may iteratively generate suggestions to reduce multiple aspects of complexity until a most efficient component design has been generated.

In some embodiments, a feature within the part may have multiple design processes that can be used to create the features. One or more rules can be made or can be used to disqualify a process. The insight service 224 may analyze a significant amount of manufacturing alternatives and different criteria and methods that might be viable to satisfy a desired outcome (design) of the product being manufactured. For example, the insight service 224 may identify multiple viable design variations and identify a lowest costing design variation, a least time consuming time variation, basic (easiest to manufacture) design variation, and the like. The insight service 224 may make multiple suggestions which are output via the user interface and which enable the designer to make the final choice on how best to proceed. The presence of certain features may create complexity while hindering manufacturing efficiency, and they can include unnecessary tolerances, dimensions that are too large, too small, materials that are not compatible with certain manufacturing processes, and the like. The insight server 120 can identify these problems and suggest alternatives that still satisfy the object of the component being designed. In some cases, the suggested changes are to enable the component to be manufactured. This modification(s) may increase cost but save the complexity down the road.

In some embodiments, the user (e.g., designer) may establish a high level of connection with the insight service 224 by classifying the part as being a machined part, a sheet metal part, a sand casting part, or the like. The insight service 224 may then identify tools, specialized machining, basic machining, geometric features including attributes such as tolerances, surfaces, bends, holes, locations, sizes, corners, and the like, based on the model included in the obtained CAD files. Furthermore, the insight service 224 may then make suggestions as to how the to change one or more geometric features of the component as identified from the model. Also, it should be appreciated that the designer may input various attributes about the part to be manufactured via the user interface 228 that may further assist the insight service 224 in identifying and making suggestions. For example, the user may input information about the material types, manufacturing types, quantity of manufacture, manufacturing time needed, and the like.

Suggestions made by the insight server 120 may include corrections or other modifications to design to change tooling, change processing, change materials, and the like. For example, a sharp internal corner that cannot be made with a cylindrical tool very easily may require a specialized tool which is less available and more expensive. This can be solved by adding a rounded edge. Another example is tolerances which can drive additional manufacturing (specialized manufacturing). Tight tolerances often require specialized finishing. Therefore, a suggestion to back-off a tolerance may eliminate the specialized finishing. As another example, a change to a size or shape of a geometric feature may reduce the number of tools (and time) needed to manufacture such a design. For example, a hole having a tolerance of $4/1000$ of an inch in sheet metal may require three separate drilling processes, but if the tolerance of the hole is backed-off to $8/1000$ of an inch it may only require one standard drilling process. In many cases, a design feature increasing complexity is not required but is simply because the designer likes the aesthetics of the design. Therefore, suggested modifications may not affect performance of the component.

Figure 2C:
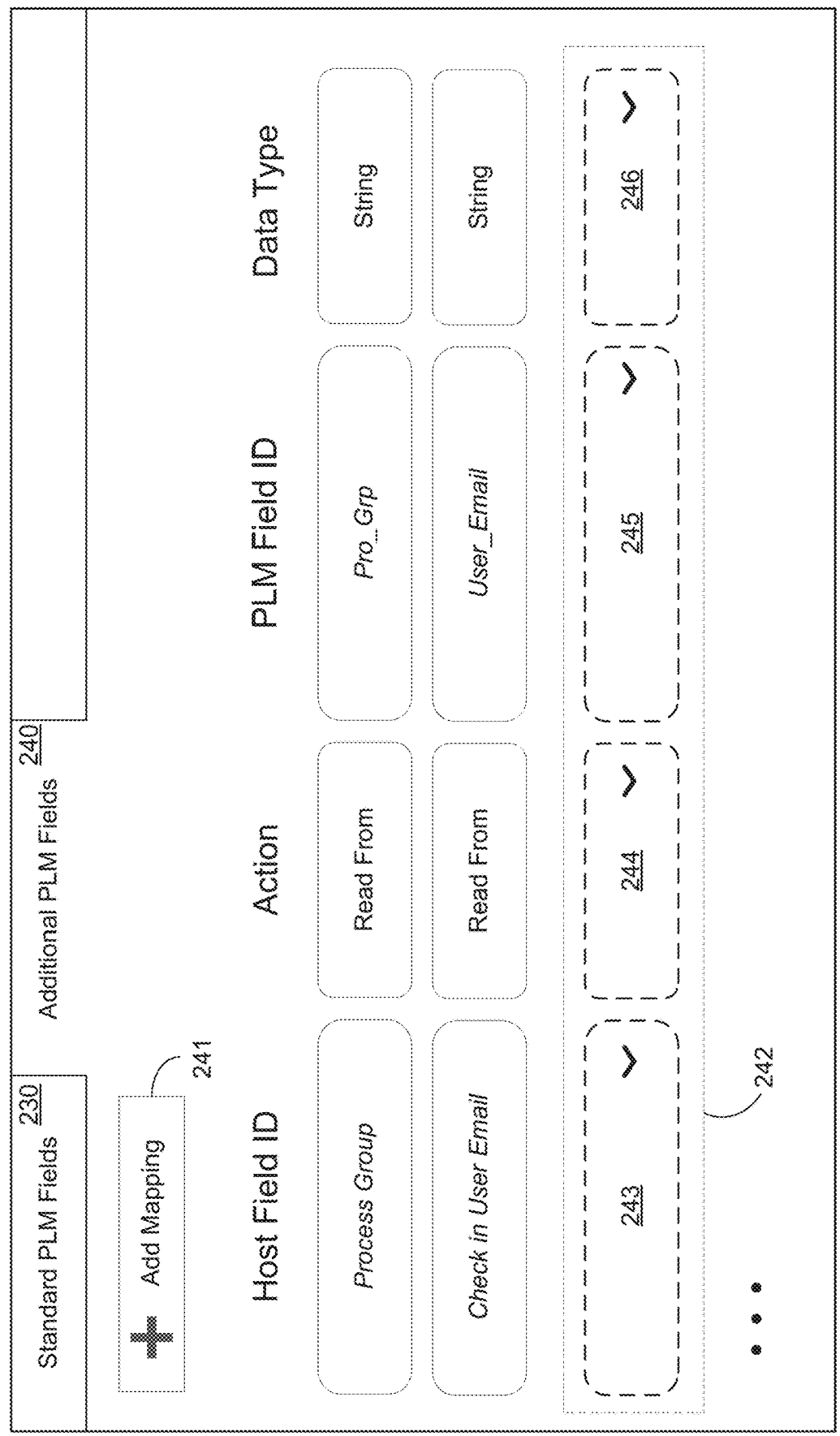

FIGS. 2B and 2C illustrate examples of mapping tables 230 and 240 of the agent 226 of FIG. 2A, in accordance with an example embodiment. Referring to FIG. 2A, a mapping table 230 may provide mapping for "standard" PLM fields. Here, the mapping includes a field name of a data value in the host platform 220 being mapped to a field name of a data value in the PLM database 214. For example, mapping entry 231 maps a field name 232 from the host platform 220 to a field name 234 of the PLM database 214. The mapping entry 231 also includes an action identifier 233 which specifies the type of action to take (e.g., reading from, writing to, etc.) with respect to the data from the PLM database 214 and a data type value 235 that specifies a type of the data value to be read. In this example, the mapping entry 231 indicates that a field with the name of "Part Identifier" stored locally in a memory of the host platform 220 is mapped to a field with the name Part ID in the PLM database 214.

When the agent 226 receives a query from the connector 222 which includes a request for data from a field name "Part Identifier", the agent 226 reviews the mapping table 230 and converts the query into a similar query that uses the field name "Part ID" based on the mapping table instead of the field name "Part Identifier". The agent 226 then generates an API call that includes the query statement with "Part ID" and transmits the API call to the API 212 which pulls the data out of the PLM database 214. In response, the agent 226 may receive the data values and/or the CAD files associated therewith in return from the PLM database 214. Each additional field (e.g., Part Number, Revision Number, etc.) may further help identify the part that is being queried or a group of parts that are being queried.

In this example, the mapping table 230 includes the "standard" PLM fields that may be included in the mapping between the host platform 220 and the PLM database 214. Each of these fields can be modified, deleted, etc., by a user. Also, new mappings can be added by the user, such as shown in FIG. 2C. In this example, the mapping table 240 may be visualized via a user interface enabling the user to interact with the mappings. Referring to FIG. 2C, a user has selected mapping table 240 and selected an "Add Mapping" button 241. In response, the mapping table initializes a new mapping sentry 242 with drop-down boxes enabling the user to select a host field name 243, an action 244, a PLM field name 245, and a data type 246. Thus, the user can create a new PLM mapping. Although not shown, the user may also edit existing mappings on the mapping table 230 or the mapping table 240 via an edit button. The additional mapping table 240 may be different based on the user's interests and the type of data being retrieved.

Figure 3A:
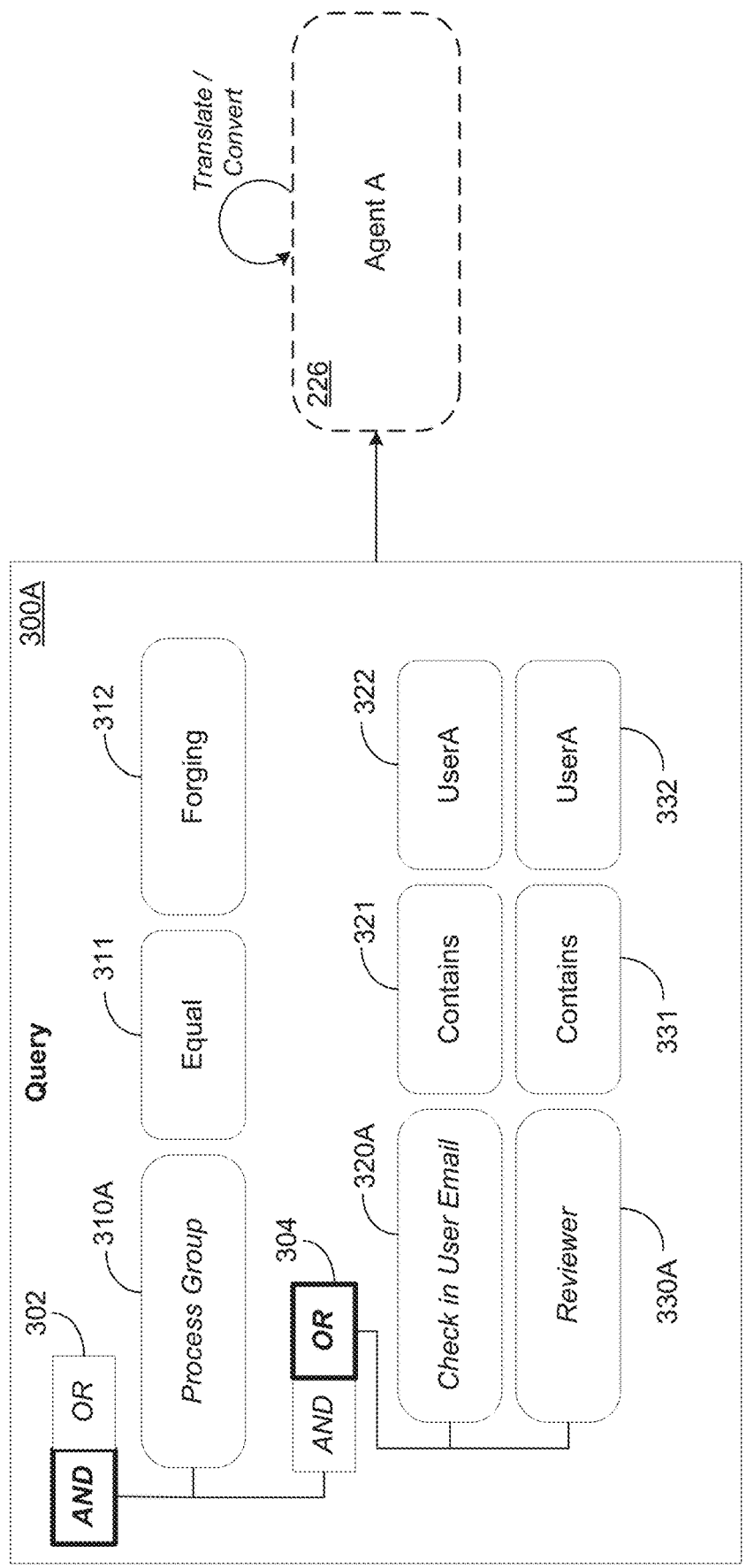
FIGS. 3A-3B are diagrams illustrating a process of translating a query via an agent software in accordance with an example embodiment.
Figure 3B:
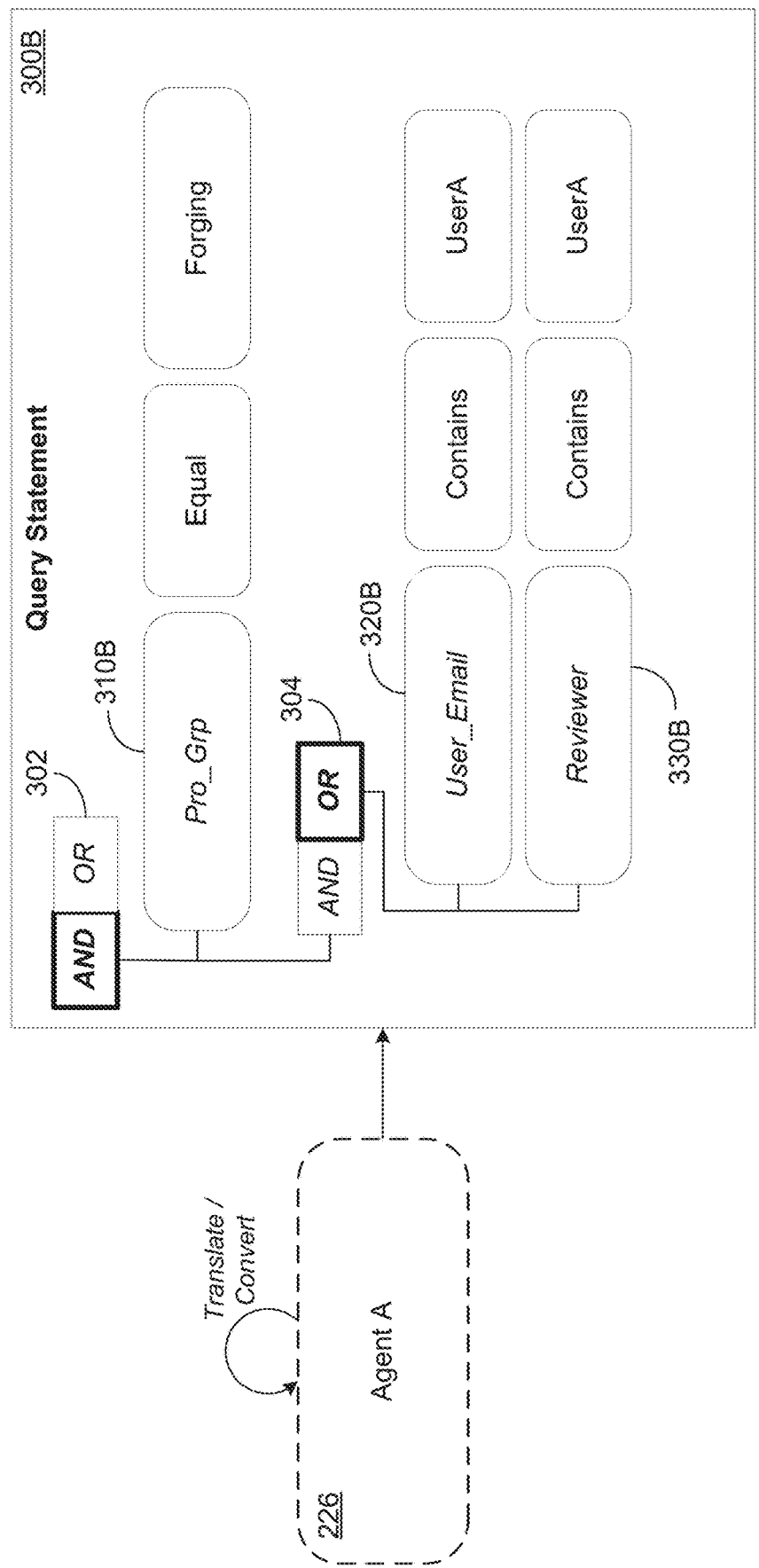

FIGS. 3A-3B illustrate a process of translating a query via an agent in accordance with an example embodiment. Referring to FIG. 3A, a query 300A is generated by a host platform (e.g., a connector, etc.) and transmitted to an agent 226. In this example, the agent 226 is installed on a PLM server. Here, the query 300A is a request for CAD files of parts that are to be created by a forging process, and which are found in the PLM database and include User A's email as an attribute or have User A as a reviewer as an attribute. In other words, the query 300A is requesting any CAD files of parts that require a forging process and that are associated with User A (e.g., as a reviewer or stored in User A's email).

The query 300A includes a first statement that specifies information about the type of data. Here, the first statement including fields 310A, 311, and 312, which specify requests CAD files from the Forging processing group. Here, the field 310A specifies a name of the field, equal specifies that the value should be equal, and 313 specifies the value itself. Thus, the request is for any CAD files that involve a forging process. An operator 302 in this case is not being used and is therefore set to default of AND. However, since only one query statement is included, there is no need for a joining operator. Meanwhile, the second statement includes fields 320A, 321, and 322, and the third statement includes fields 330A, 331, and 332, which both specify attributes of the data. Here, the second statement and the third statement are joined by an operator 304 (i.e., OR) which specifies that the CAD file may include either the second statement or the third statement. In this example, the second statement requests that the CAD files be included in User A's emails or that the CAD file have User A as a reviewer of the file.

In response to receiving the query 300A, the agent 226 may translate the query terms including values within the individual statements based on the mappings that are stored in the mapping tables 230 and/or 240. Referring to FIGS. 3A and 3B, the agent 226 translates the query 300A into the query 300B. Here, the values in fields 310A, 320A, and 330A of query 300A, have been modified/converted into the values shown in fields 310B, 320B, and 330B of the query 300B. In this case, the value "Process Group" in field 310A is converted to "Pro Group" in the field 310B. Likewise, the value "Check in User Email" in field 320A is converted to the value "User Email" in field 320B of query 300B, and the value "Reviewer" in field 330A remains the same in field 330B.

Once the query 300A has been converted into the query 300B, the agent 226 may transmit API calls representing the query 300B to the PLM database, via the API of the PLM database. In some embodiments, the query 300B may be the same query received by the agent 226, with modified data values therein. As another example, the query 300B may be a different query that is instantiated by the agent 226 in response to receiving the query 300A.

FIG. 4 illustrates a method 400 for extracting PLM data and generating insight of a component in accordance with an example embodiment. As an example, the method 400 may be performed by a server, a user device, a cloud platform, or other computing system or combination of systems. Referring to FIG. 4, in 410, the method may include querying a database for a plurality of values of a part to be manufactured from a plurality of fields of computer-aided design (CAD) file stored in the database. The query may include a statement or a plurality of statements which specify data values of CAD files to be obtained from the PLM database and attributes of the CAD file.

In 420, the method may include mapping the plurality of fields of the CAD file to a plurality of corresponding fields of a host platform based on a type of the database. In 430, the method may include extracting the plurality of values from the CAD file and transferring the plurality of values to the mapped plurality of corresponding fields of the host platform. In 440, the method may include determining changes to one or more manufacturing attributes of the part to be manufactured based on the transferred plurality of values. In 450, the method may include outputting the changes to a display. In some embodiments, between steps 430 and 440, geometric values (sizes, angles, shapes, etc.) of the part to be manufactured which are embedded in the CAD file may be extracted and processed. For example, reading the geometry and producing GCDs can be used as inputs to the costing methodology. Thus, the costing process can be automated. Furthermore, finding parts that should be costed, retrieving and setting up the costing inputs, retrieving the CAD models, invoking the insight service 224, pushing out notifications and reports, and writing back values to the PLM database are all automated as well by the example embodiments.

In some embodiments, the querying may include generating application programming interface (API) calls which identify the plurality of fields of the CAD file and transmitting the API calls to the database. In some embodiments, the database may include a product lifecycle management (PLM) database, and the mapping may include mapping fields from the PLM database to corresponding fields of a host platform, where the corresponding fields of the host platform have different field names than the fields from the PLM database. In some embodiments, the querying may include transmitting a query statement to the database which includes a plurality of fields embedded therein including a part identifier value, a part number value, and a revision number value, of the part to be manufactured.

In some embodiments, the mapping may include mapping the plurality of fields of the CAD file to the plurality of corresponding fields of the host platform via an agent installed in at least one of the database and an intervening computing system between the database and the host platform. In some embodiments, the mapping the plurality of fields of the CAD file to the plurality of corresponding fields of the host platform may include generating different mappings based on whether the CAD file is extracted from a first type of database or a second type of database. In some embodiments, the method may further include receiving a query comprising identifiers of the plurality of corresponding fields from the host platform, and translating the query into an application programming interface (API) call based on an API of the database, prior to querying the database. In some embodiments, the determining may include identifying changes to one or more attributes of the part to be manufactured to reduce cost of manufacturing, and displaying the identified changes via a user interface.

Figure 5:
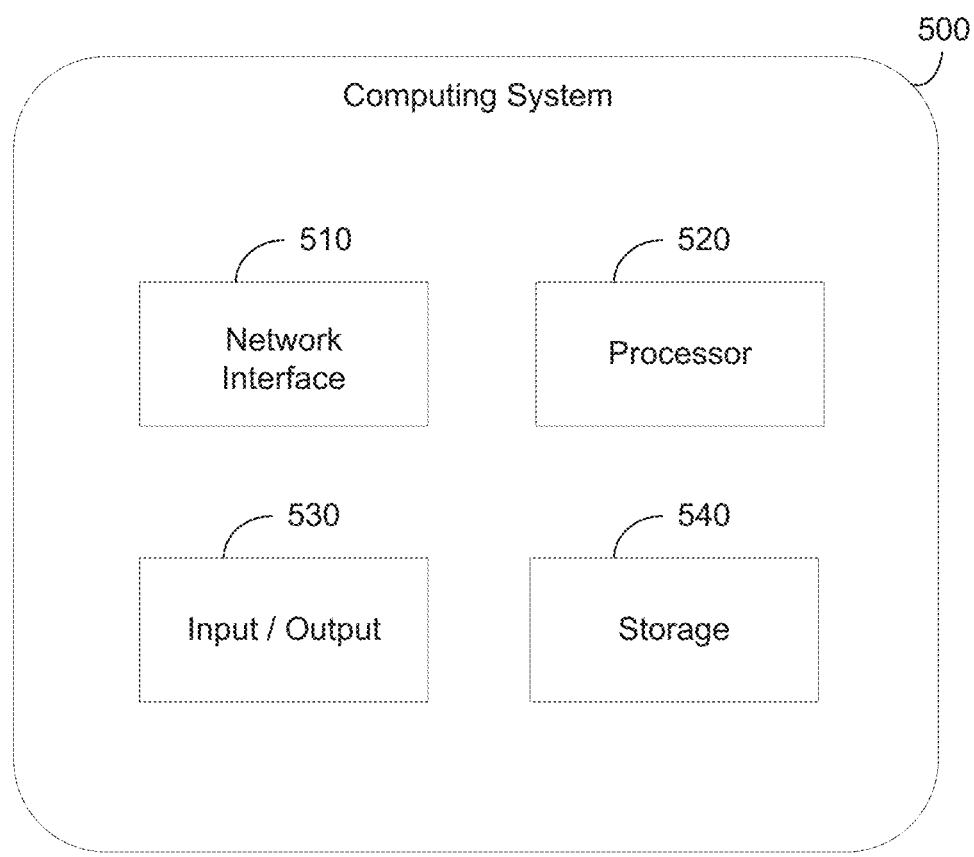
FIG. 5 is a diagram illustrating a computing system in accordance with an example embodiment.

FIG. 5 illustrates a computing system 500 that can perform an object copy operation, in accordance with an example embodiment. For example, the computing system 500 may be a database node, a server, a cloud platform, a user device, or the like. In some embodiments, the computing system 500 may be distributed across multiple devices. Referring to FIG. 5, the computing system 500 includes a network interface 510, a processor 520, an output 530, and a storage device 540 such as an in-memory. Although not shown in FIG. 5, the computing system 500 may also include or be electronically connected to other components such as a display, an input unit, a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable.

The output 530 may output data to an embedded display of the computing system 500, an externally connected display, a display connected to a cloud platform, another computing device, and the like. For example, the output 530 may include a port, an interface, a cable, a wire, a board, and/or the like, with input/output capabilities. The network interface 510, the output 530, or a combination thereof, may interact with applications executing on other devices. The storage device 540 is not limited to a particular storage device and may include any known memory device such as RAM, ROM, hard disk, and the like, and may or may not be included within the cloud environment. The storage 540 may store software modules or other instructions which can be executed by the processor 520 to perform the method 400 shown in FIG. 4.

According to various embodiments, the processor 520 may receive an image including a geometric design of a component. The image may include a technical model such as CAD, or the like. The processor 520 may receive an identification of a type of manufacturing process for the component from among a plurality of types of manufacturing processes. The types may include a plastic molding process, a sheet metal process, a casting process, and the like. The processor 520 may recognize a geometric feature of the component from the image based on the type of manufacturing process, and determine a suggested modification to one or more of a size, a shape, and a location of the recognized geometric feature to reduce manufacturing complexity. The geometric feature may be represented from a geometric boundary representation of the component/part within the input model. Furthermore, the output 530 may output, to a user interface, a suggestion on how to modify the geometric design of the component based on the determined modification of the recognized geometric feature.

In some embodiments, the processor 520 may recognize one or more of a bend, a corner, a hole, and a surface of the component from the image based on geometric lines, breaks, shapes, holes, and the like, included in the drawing. The processor 520 may determine the correction based on one or more of a type of tool used to create the recognized geometric feature, a number of tools used to create the recognized geometric feature, a tolerance of the recognized geometric feature, a material of the recognized geometric feature, an amount of time predicted to manufacture the recognized geometric feature, and the like. The processor may automatically detect one or more different tools to be used. In some cases, the user may provide a type of tool that they desire to use with the drawing, and the processor 520 may detect one or more other tools that can be used instead, or in addition to help improve complexity.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, interne of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
receive a query from a host platform via an agent installed on a product lifecycle management (PLM) database, wherein the query comprises a request for a plurality of values of a part to be extracted from a plurality of fields of a PLM object stored in the PLM database, wherein the host platform is connected to the agent via a computer network, and the plurality of fields comprise a plurality of field names in a format of the host platform, translate, via the agent installed at the PLM database, the plurality of field names in the format of the host platform into a plurality of field names in a format of an application programming interface (API) of the PLM database,
execute, via the agent installed at the PLM database, an API call on the PLM database based on the plurality of translated field names to extract the plurality of values of the part from the plurality of translated field names within the PLM object stored in the PLM database, and
transfer the plurality of values extracted from the agent installed at the PLM database to the host platform,
determine changes to one or more manufacturing attributes of the part to be manufactured based on the transferred plurality of values, and
output the changes to a display.

2. The computing system of claim 1, wherein the processor is configured to generate one or more API calls via the agent installed at the PLM database which identify the plurality of field names in the format of the API of the PLM database and transmit the one or more API calls to the PLM database.

3. The computing system of claim 1, wherein the processor is configured to map fields from the PLM database to corresponding fields of the host platform via the agent installed at the PLM database based on a type of the PLM database.

4. The computing system of claim 1, wherein the processor is configured to transmit a query statement, via the agent installed at the PLM database, to the PLM database which includes a part identifier value, a part number value, and a revision number value, of the part to be manufactured.

5. The computing system of claim 1, wherein the processor is configured to generate different mappings based on whether the API call is to be executed on an API of a first type of PLM database or an API of a second type of PLM database.

6. The computing system of claim 1, wherein the processor is configured to identify changes to one or more attributes of the part to be manufactured to reduce cost of manufacturing, and display the identified changes via a user interface.

7. A method comprising:
receiving a query from a host platform via an agent installed on a product lifecycle management (PLM) database, wherein the query comprises a request for a plurality of values of a part to be extracted from a plurality of fields of a PLM object stored in the PLM database where the agent is installed, the host platform is connected to the agent installed at the PLM database via a computer network, and the plurality of fields comprise a plurality of field names in a format of the host platform;
translating, via the agent installed on the PLM database, the plurality of field names in the format of the host platform into a plurality of field names in a format of an application programming interface (API) of the PLM database;
executing, via the agent installed on the PLM database, an API call on the PLM database based on the plurality of translated field names to extract the plurality of values of the part from the plurality of translated field names within the PLM object stored in the PLM database;
transferring the plurality of values extracted from the agent installed at the PLM database to the host platform;
determining changes to one or more manufacturing attributes of the part to be manufactured based on the transferred plurality of values; and
outputting the changes to a display.

8. The method of claim 7, wherein the executing comprises generating one or more API calls via the agent installed on the PLM database which identify the plurality of field names in the format of the API of the PLM database and transmitting the one or more API calls to the PLM database.

9. The method of claim 7, wherein the translating comprises mapping fields from the PLM database to corresponding fields of the host platform via the agent installed on the PLM database, where the corresponding fields of the host platform have different field names than the fields from the PLM database.

10. The method of claim 7, wherein the executing comprises transmitting a query statement, via the agent installed at the PLM database, to the PLM database which includes a part identifier value, a part number value, and a revision number value, of the part to be manufactured.

11. The method of claim 7, wherein the translating comprises translating the plurality of field names in the format of the host platform into the plurality of translated field names in the format of the PLM database via an agent installed in an intervening computing system between the PLM database and the host platform.

12. The method of claim 7, wherein the mapping the plurality of fields comprises generating different mappings based on whether the API call is to be executed on an API of a first type of PLM database or an API of a second type of PLM database.

13. The method of claim 7, wherein the determining comprises identifying changes to one or more attributes of the part to be manufactured to reduce cost of manufacturing, and displaying the identified changes via a user interface.

14. A non-transitory computer-readable medium that includes instructions which when executed by a processor cause a computer to perform a method comprising:
receiving a query from a host platform via an agent installed on a product lifecycle management (PLM) database, wherein the query comprises a request for a plurality of values of a part to be extracted from a plurality of fields of a PLM object stored in the PLM database where the agent is installed, wherein the plurality of fields comprise a plurality of field names in a format of Hail the host platform;
translating, via the agent installed at the PLM database, the plurality of field names in the format of the host platform into a plurality of field names in a format of an application programming interface (API) of the PLM database;
executing, via the agent installed at the PLM database, an API call on the PLM database based on the plurality of translated field names to extract the plurality of values of the part from the plurality of translated field names within the PLM object stored in the PLM database;
transferring the plurality of values extracted from the agent installed at the PLM database to the host platform;
determining changes to one or more manufacturing attributes of the part to be manufactured based on the transferred plurality of values; and
outputting the changes to a display.

15. The non-transitory computer-readable medium of claim 14, wherein the executing comprises generating one or more API calls via the agent installed at the PLM database which identify the plurality of field names in the format of the API of the PLM database and transmitting the one or more API calls to the PLM database.

16. The non-transitory computer-readable medium of claim 14, wherein the translating comprises mapping fields from the PLM database to corresponding fields of the host platform via the agent installed at the PLM database, where the corresponding fields of the host platform have different field names than the fields from the PLM database.

17. The non-transitory computer-readable medium of claim 14, wherein the executing comprises transmitting a query statement, via the agent installed at the PLM database, to the PLM database which includes a part identifier value, a part number value, and a revision number value, of the part to be manufactured.

* * * * *